United States Patent [19]

Layton

[11] Patent Number: 4,753,529

[45] Date of Patent: Jun. 28, 1988

[54] APPARATUS AND METHOD FOR PRECISION ADJUSTMENT OF INTERFEROMETER PATHLENGTH DIFFERENCE

[75] Inventor: Michael R. Layton, Newbury Park, Calif.

[73] Assignee: Litton Systems, Inc., Beverly Hills, Calif.

[21] Appl. No.: 877,484

[22] Filed: Jun. 23, 1986

[51] Int. Cl.$^4$ .............................................. G01B 9/02
[52] U.S. Cl. .................................. 356/345; 250/227; 356/358
[58] Field of Search ........................ 356/345, 358, 383; 250/227

[56] References Cited

U.S. PATENT DOCUMENTS

| | | | |
|---|---|---|---|
| 3,990,036 | 11/1976 | Savit | 340/15.5 TS |
| 4,360,272 | 11/1982 | Schmadel et al. | 356/352 |
| 4,368,981 | 1/1983 | Ozeki | 356/352 |
| 4,443,700 | 4/1984 | Macedo et al. | 250/227 |
| 4,505,587 | 3/1985 | Haus et al. | 356/345 |
| 4,552,457 | 11/1985 | Giallorenzi | 356/345 |

FOREIGN PATENT DOCUMENTS

| | | | |
|---|---|---|---|
| 0023345 | 2/1981 | European Pat. Off. | |
| 3224775 | 1/1983 | Fed. Rep. of Germany | |
| 7900377 | 6/1979 | World Int. Prop. O. | |
| 8301303 | 4/1983 | World Int. Prop. O. | 356/350 |
| 2096762 | 10/1982 | United Kingdom | |

OTHER PUBLICATIONS

Sheem et al., "Wavelength Monitoring of Single-Mode Diode Laser Using Guided-Wave Interferometer", Optics Letters, vol. 5, No. 5, pp. 179-181, 5/80.

Dandridge, et al., "Phase Compensation in Interferometric Fiber Optic Sensors", Optics Letters, vol. 7, No. 6, Jun. 1982, pp. 279-281.

Nelson et al., "Passive Multiplexing Systems for Fiber Optic Sensors", Applied Optics, 9/1980, pp. 2917-2920.

Kersey et al., "Demodulating Scheme Fibre Interferometric Sensors Employing Laser Frequency Switching", Electronics. Lett., vol. 19, No. 3, pp. 102-103, (2/13/83).

Nelson et al., "Passive Techniques for Fiber Optics Sensors Systems", I.F.O.C., 3/1981, pp. 27-30.

Primary Examiner—Davis L. Willis
Assistant Examiner—Matthew W. Koren
Attorney, Agent, or Firm—John H. Lynn

[57] ABSTRACT

Intensity modulated incoherent light is input to an interferometer. The interferometer is preferably formed to have a first arm comprising a first optical fiber and a second arm comprising a second optical fiber. The fibers have an initial optical pathlength difference $\Delta L_o$. The refractive index of a selected one of the optical fibers is determined, and the output of the interferometer is monitored to detect a null signal output with an initial predetermined frequency resolution bandwidth. The initial length resolution is calculated, and the length of one of the fibers is reduced. The frequency resolution bandwidth is then reduced to a new predetermined value, and the frequency providing a null signal output at the new frequency resolution bandwidth is measured. The process is repeated until the pathlength difference becomes a predetermined value.

21 Claims, 6 Drawing Sheets

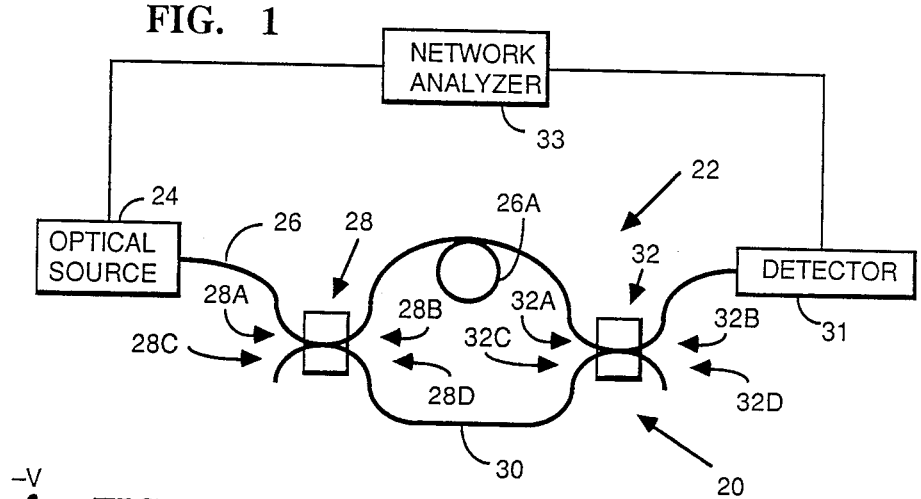
FIG. 1
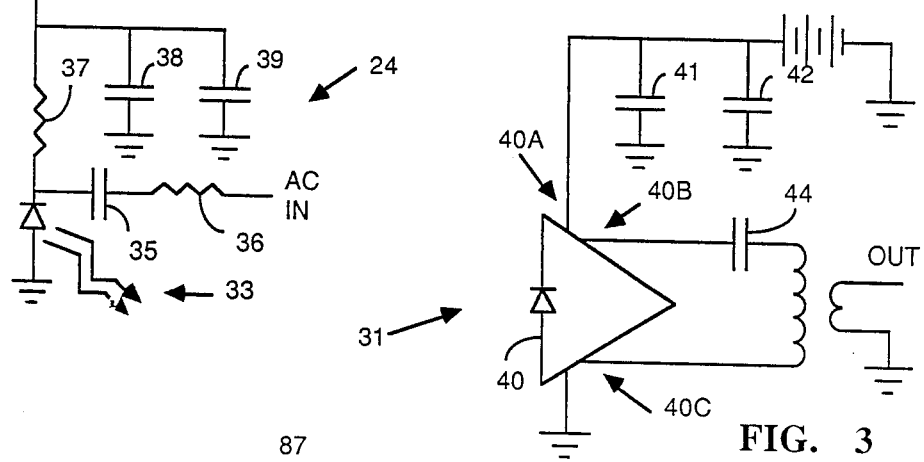
FIG. 2
FIG. 3
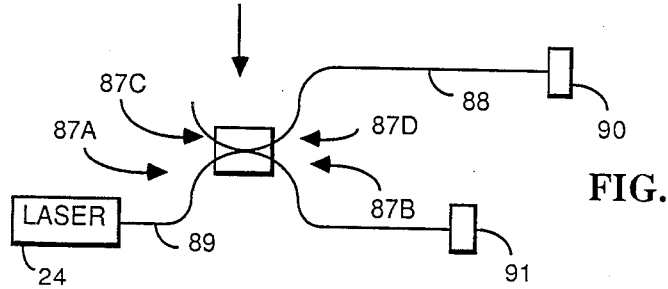
FIG. 18

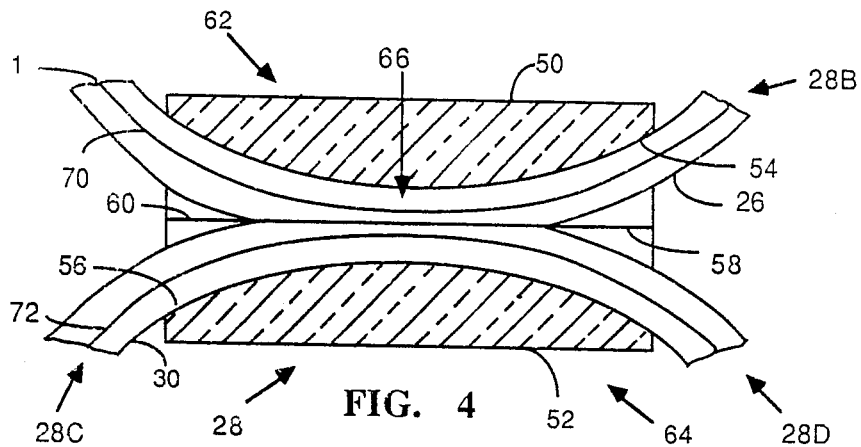
FIG. 4
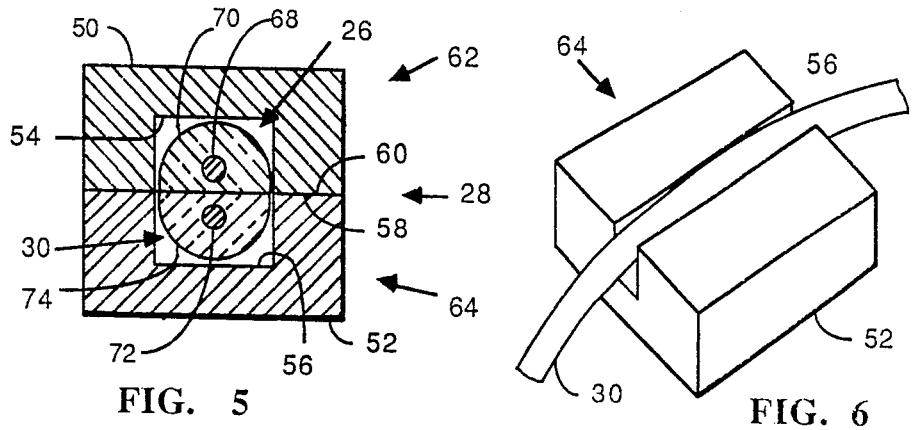
FIG. 5
FIG. 6
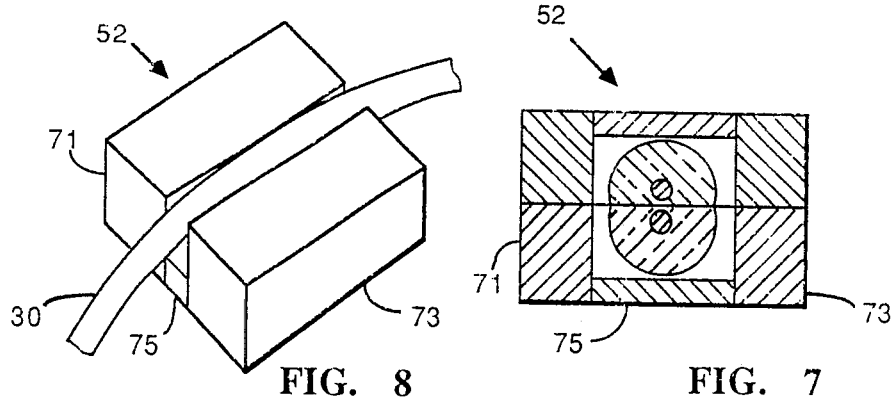
FIG. 8
FIG. 7

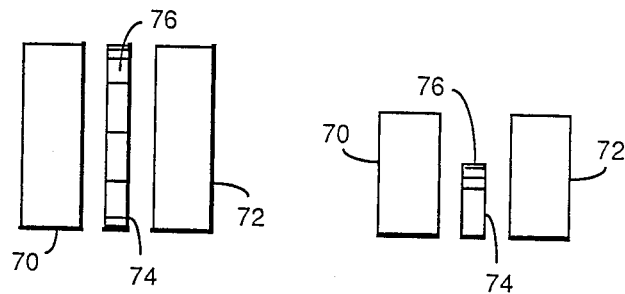
FIG. 9
FIG. 10
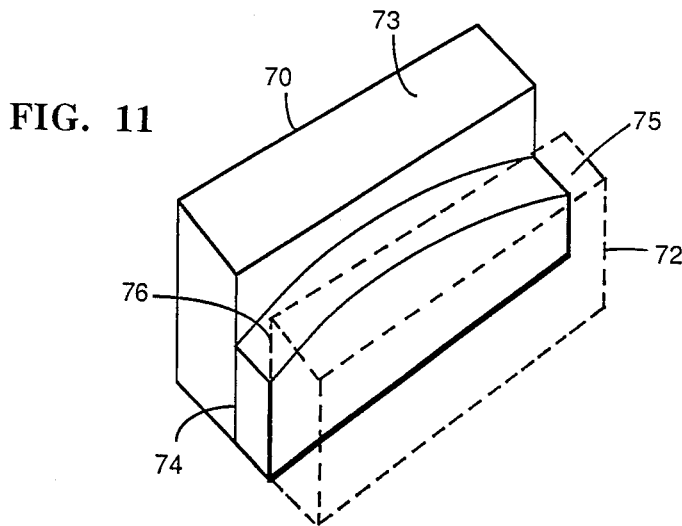
FIG. 11
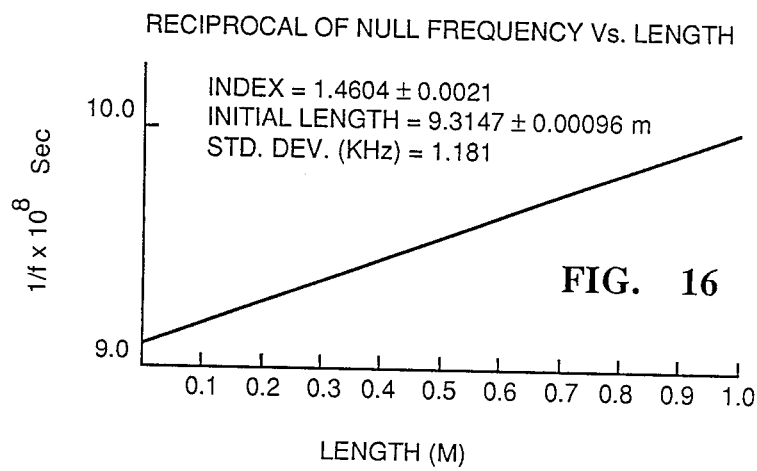
RECIPROCAL OF NULL FREQUENCY Vs. LENGTH
INDEX = 1.4604 ± 0.0021
INITIAL LENGTH = 9.3147 ± 0.00096 m
STD. DEV. (KHz) = 1.181
FIG. 16

TYPICAL NULL AT
35TH MULTIPLE OF
CHARACTERISTIC
FREQUENCY

APPARATUS AND METHOD FOR PRECISION ADJUSTMENT OF INTERFEROMETER PATHLENGTH DIFFERENCE

BACKGROUND OF THE INVENTION

This invention relates generally to fiber optic sensors. In particular, this invention relates to apparatus and methods for adjusting the lengths of optical fibers used in unbalanced fiber optic interferometric sensor systems.

Optical fibers are sensitive to a large number of physical phenomena, such as acoustic waves and temperature fluctuations. An optical fiber exposed to such phenomena changes the amplitude, phase or polarization of light guided by the fiber. Optical fibers have been considered for use as sensing elements in devices such as hydrophones, magnetometers, accelerometers and electric current sensors.

Mach-Zehnder and Michelson interferomaters respond to the phenomenon being sensed by producing phase differences in interfering light waves. Detecting phase changes in the waves permits quantitative measurements to be made on the physical quantity being monitored.

Mach-Zehnder interferometers are particularly sensitive to acoustic vibrations. A fiber optic Mach-Zehnder interferometer typically has a reference arm comprising a first length of optical fiber and a sensing arm comprising a second length of optical fiber. The sensing arm guides a sensing signal, and the reference arm guides a reference signal. These signal combine in an optical coupler to produce an interference pattern that depends upon the optical path difference between the sensing and reference arms. The sensing arm is exposed to a physical parameter, such as an acoustic wavefront, to be measured while the reference arm is isolated from changes in the parameter. When the Mach-Zehnder interferometer is used as an acoustic sensor, acoustic wavefronts change the optical length of the sensing arm as a function of the acoustic wave intensity. An optical coupler divides a light signal between the two arms. Changes in the length of the sensing arm are indicated by changes in the phase of the sensing and reference signals. The signals are combined after they have propagated through the reference and sensing arms, and the phase difference of the signals is monitored. Since the signals in the reference and sensing arms had a definite phase relation when they were introduced into the arms, changes in the phase difference are indicative of changes in the physical parameter to which the sensing arm was exposed.

A Michelson interferometer also has a sensing arm and a reference arm that propagate sensing and reference signals, respectively. However, in the Michelson interferometer these arms terminate in mirrors that cause the sensing and reference signals to traverse their respective optical paths twice before being combined to produce an interference pattern.

The performance of a dual wavelength, mismatched pathlength interferometric sensor relies on matching the frequency difference between two optical pulses used to interrogate the sensor to the optical path difference between the sensing and reference arms of the sensor. This frequency difference may be expressed mathematically as $$f = c/(4nL) \qquad (1)$$

where
- $f$ = frequency difference between optical pulses;
- $c$ = free space velocity of light;
- $n$ = effective refractive index of the optical fiber; and
- $L$ = length difference between interferometer arms.

For a single sensor, one can tune frequency shifting circuitry to adjust the optical signal input frequency to meet the conditions of Equation (1). However, when the same pair of optical pulses interrogate multiple sensors, as for example in a time division multiplexed system, each sensor must be well-matched to the next. If the path differences are not properly matched, then it may be difficult or impossible to match sensors and their outputs. Errors in path difference produce optical phase noise in the sensor system. In order to achieve the required matching between sensors, the error in path difference between the compensating interferometer and the sensing interferometer must be well within the coherence length of the optical signal source in the system.

SUMMARY OF THE INVENTION

The present invention provides a method and apparatus for repeatedly constructing pathlength mismatched interferometers such as Mach-Zehnder and Michelson interferometers with a particular optical pathlength difference between the sensing and reference arms.

A method according to the invention for adjusting the pathlength difference in an optical pathlength mismatched interferometer having a first arm and a second arm comprises the steps of inputting portions of intensity modulated incoherent light into the first and second arms and monitoring signals output from the interferometer. The method also includes adjusting the length of one of the arms to produce a predetermined signal output from the interferometer. The length of one of the arms is preferably reduced to produce a null signal output from the interferometer. The method may further include the step of adjusting the arms to propagate substantially equal light intensities.

The interferometer is preferably formed such that the first arm comprises a first optical fiber and the second arm comprises a second optical fiber. The method according to the invention may include the steps of determining the refractive index of a selected one of the optical fibers; and removing a length of fiber from the selected fiber. The frequency of a null signal output from the interferometer is measured and the pathlength difference of the interferometer arms is determined.

The method may also include the step of calculating the refractive index using the equation $n = mc/(2Lf_m)$ where $n$ is the refractive index of the fiber, $c$ is the free space velocity of light, $m$ is an odd integer, $L$ is the length of the fiber, and $f_m$ is the null frequency corresponding to the $m^{th}$ multiple of the fundamental frequency. The method may, further including the steps of: (a) forming the interferometer such that the first arm comprises a first optical fiber and the second arm comprises a second optical fiber, the optical fibers providing an optical pathlength difference $\Delta L_o$, (b) determining the refractive index of a selected one of the optical fibers; (c) measuring the null frequency with an initial predetermined frequency resolution bandwidth; (d) calculating an initial length resolution using the equation $\Delta L = mc\Delta f/(2nf_m^2)$, where $n$ is the refractive index of the fiber, $c$ is the free space velocity of light, $m$ is an odd integer, and $f_m$ is the null frequency corresponding to the $m^{th}$ multiple of fundamental frequency of the interferometer; (e) reducing the length of the selected fiber; (f) reducing the frequency resolution bandwidth to a new predetermined value; (g) measuring the null frequency at the new frequency resolution bandwidth; and (h) repeating steps (d) through (g) until a predetermined length resolution is obtained.

The apparatus according to the invention for adjusting the pathlength difference in a pathlength mismatched interferometer having a first arm and a second arm, comprises means for inputting portions of intensity modulated incoherent light into the first and second arms; means for monitoring signals output from the interferometer; and means for adjusting the length of one of the arms to produce a predetermined signal output from the interferometer. The apparatus may also include means for reducing the length of one of the arms to produce a null signal output from the interferometer at a predetermined frequency. The apparatus may further include means for adjusting the arms to propagate substantially equal light intensities.

The apparatus according to the invention may also further include means for forming the interferometer such that the first arm comprises a first optical fiber and the second arm comprises a second optical fiber, means for determining the refractive index of a selected one of the optical fibers; and means for removing a length of fiber from the selected fiber to produce a null signal output from the interferometer.

The apparatus of the invention for for measuring the refractive index may include means for measuring the null signal for a known length of the selected fiber; and computing means for calculating the refractive index using the equation $n = mc/(2Lf_m)$ where n is the refractive index of the fiber, c is the free space velocity of light, m is an odd integer, L is the length of the fiber, and $f_m$ is the null frequency corresponding to the integer m.

The apparatus of the invention for adjusting the pathlength mismatch in an interferometer formed such that the first arm comprises a first optical fiber and the second arm comprises a second optical fiber may further include means for determining the refractive index of a selected one of the optical fibers and means for measuring the null frequency with an initial predetermined frequency resolution bandwidth to determine an initial length resolution. This device includes means for reducing the length of the selected fiber and means for reducing the frequency resolution bandwidth to a new predetermined value. the device also includes means for measuring the null frequency at the new frequency resolution bandwidth to determine a new length resolution.

BRIEF DESCRIPTION OF THE DRAWINGS

FIG. 1 illustrates a fiber optic Mach-Zehnder interferometer and a system according to the invention for adjusting the lengths of the arms of the interferometer;

FIG. 2 is a schematic diagram of a superluminescent diode that may be used as an optical signal source in the system of FIG. 1;

FIG. 3 is a schematic diagram of a photodiode that may be used as an optical signal detector in the system of FIG. 1;

FIG. 4 is a cross sectional view of an optical coupler that may be included in the interferometer of FIG. 1;

FIG. 5 is a cross sectional view about line 5—5 of FIG. 4;

FIG. 6 is a perspective view of a coupler half included in the coupler of FIGS. 4 and 5;

FIG. 7 is a cross sectional view of a second optical coupler structure that may be included in the Mach-Zehnder interferometer of FIG. 1;

FIG. 8 is a perspective view of a couple half included in the optical coupler of FIG. 7;

FIG. 9 is an exploded plan view of the coupler half of FIG. 8;

FIG. 10 is an exploded end view of the coupler half of FIGS. 8 and 9;

FIG. 11 is a cutaway perspective view of the coupler half of FIGS. 8–10;

FIG. 16 graphically illustrates the reciprocal of the null frequency in the output of the interferometer in FIG. 1 as a function of pathlength;

FIG. 18 is a schematic diagram of a Michelson interferometer that may be adjusted with the apparatus and method of the invention.

DESCRIPTION OF THE PREFERRED EMBODIMENT

Figure 12:
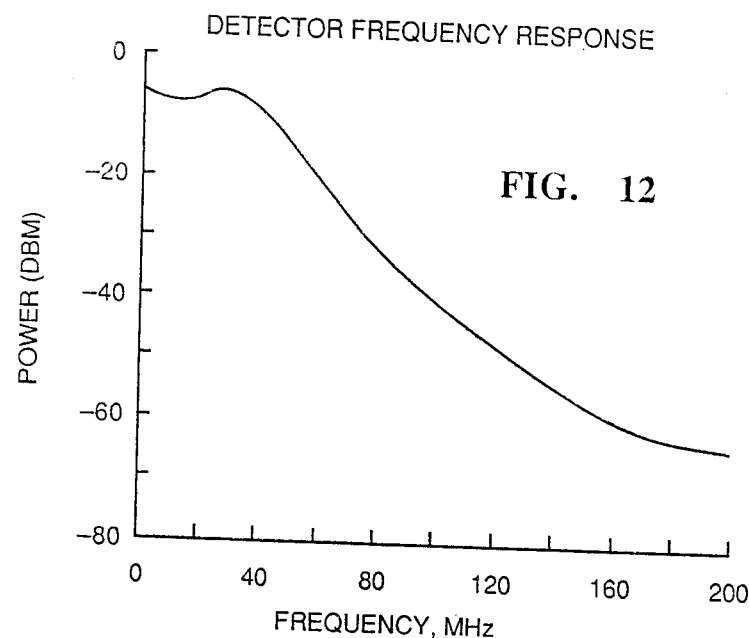
FIG. 12 graphically illustrates the frequency response of the detector in the system of FIG. 1.

Referring to FIG. 1, a system 20 for adjusting the pathlengths in an interferometric sensor 22 includes a light source 24 for introducing light into an optical fiber 26. The light source 24 is preferably a short coherence length superluminescent diode or a light emitting diode. After being introduced into optical fiber 26, the light propagates to an optical coupler 28 that couples light between optical fiber 26 and an optical fiber 30.

The circle in optical fiber 26 represents a coil 26A comprising N turns of optical fiber. An optical coupler 32 formed between the fibers 26 and 30 combines a portion of the light in the fiber 30 with the light remaining in the fiber 26. The combined beams propagate to a detector 31. Therefore, the light incident upon the detector 31 is the incoherent superposition of the two light waves that had been guided by the fibers 26 and 3. Optical couplers 28 and 30 and optical fibers 26 and 32 comprise the Mach-Zehnder interferometer 22. A network analyzer 34 may be connected between the optical source 24 and the detector 31.

Referring to FIG. 2, the optical source 24 preferably includes a superluminescent diode 33 having its cathode connected to ground and its anode connected to the network analyzer 34 and to a bias voltage source $-V$. The light source 24 may include a capacitor 35 and a resistor 36 connected in series between the anode and the network analyzer 34. The network analyzer 34 preferably is capable of producing output signals in the frequency range of about 50 KHz to 200 MHz. The output of the network analyzer 34 modulates the magnitude of the current to the SLD 33. Therefore, the intensity of the optical output of the SLD is intensity or amplitude modulated by the output of the network analyzer 34. A current limiting resistor 37 may be connected between the bias voltage source and the anode. A pair of capacitors 38 and 39 connected in parallel with each other are preferably connected between the bias voltage source and the ground. The capacitor 38 may have a capacitance of about 1.0 $\mu$F, and the capacitor 39 may have a capacitance of about 0.01 $\mu$F.

Referring to FIG. 3, the detector 31 preferably includes a light sensitive diode 40. Power may be supplied to the diode 40 by a power supply 42 connected between ground and a power input terminal 40A of the diode 40. A pair of capacitors 41 and 42 connected in parallel with one another are preferably connected between the power input terminal 40A and ground. The capacitor 41 may have a capacitance of about 1.0 $\mu$F, and the capacitor 42 may have a capacitance of about 0.01 $\mu$F. The diode 40 has output terminals 40B and 40C. The diode 40 produces an electrical signal in response to light incident thereon. The electrical output of the diode 40 is input to a primary transformer coil 43A that is connected across the output terminals 40B and 40C. A capacitor 44 may be connected between output terminal 40B and the transformer coil 43A. The electrical output of the detector is taken across the terminals of a secondary transformer coil 43B. The response of the detector 31 to frequencies ranging from DC to 200 MHz is shown in FIG. 12. The response is relatively flat up to about 40 MHz. The response decreases from about $-10$ dB at 40 MHz to about $-65$ dB at 200 MHz.

The fiber optic components of the interferometric sensor system 20 will be described in detail before describing the method of operation of the invention to adjust the pathlength difference of interferometric sensors.

Optical Couplers

Both of the optical couplers 28 and 32 may be of substantially identical structure; therefore, the following description of the optical coupler 28 is applicable to all optical couplers included in the interferometric sensor system 22 when the optical fibers 26 and 30 are single mode fibers. For multimode fiber implementations of the interferometric sensor system 22, suitable multimode couplers (not shown) are well-known in the art.

A type of multimode coupler suitable for forming the sensor in multimode applications described in U.S. patent application Ser. No. 816,881 by John J. Fling. This application is assigned to Litton Systems, Inc., assignee of the present invention.

A fiber optic directional coupler suitable for use in single mode applications as the couplers 14, 30, 22 and 30 of FIG. 1 is described in the Mar. 29, 1580 issue of *Electronics Letters*, Vol. 28, No. 28. pp. 260–261 and in U.S. Pat. No., 4,493,528 issued Jan. 15, 1985 to Shaw et al. That patent is assigned to the Board of Trustees of the Leland Stanford Junior University.

As illustrated in FIGS. 4–6, the coupler 28 includes the optical fibers 26 and 30 of FIG. 1 mounted in a pair of substrates 50 and 52, respectively. The fiber 26 is mounted in a curved groove 54 formed in an optically flat surface 58 of the substrate 50. Similarly, the fiber 30 is mounted in a curved groove 56 formed in an optically flat surface 60 of the substrate 52. The substrate 50 and fiber 26 mounted therein comprise a coupler half 62, and the substrate 52 and fiber 30 mounted therein comprise a coupler half 64.

The curved grooves 54 and 56 each have a radius of curvature that is large compared to the diameters of the fibers 26 and 30, which are ordinarily substantially identical. The widths of the grooves 54 and 56 are slightly larger than the fiber diameters to permit the fibers 26, 30 to conform to the paths defined by the bottom walls of the grooves 54 and 56, respectively. The depths of the grooves 54 and 56 vary from a minimum at the center of the substrates 50 and 52, respectively, to a maximum at the edges of the substrates 50 and 52. The variation in groove depth permits the optical fibers 26 and 30, when mounted in the grooves 54 and 56, respectively, to gradually converge toward the centers and diverge toward the edges of the substrates 50 and 52, respectively. The gradual curvature of the fibers 26 and 30 prevents the occurrence of sharp bends or other abrupt changes in direction of the fibers 26 and 30 to avoid power loss through mode perturbation. The grooves 54 and 56 may be rectangular in cross section; however, it is to be understood that other cross sectional configurations such as U-shaped or V-shaped may be used in forming the coupler 28.

Referring to FIGS. 4–6, at the centers of the substrates 50 and 52, the depths of the grooves 54 and 56 are less than the diameters of the fibers 26 and 30. At the edges of the substrates 50 and 52, the depths of the grooves 54 and 56 are preferably at least as great as the fiber diameters. Fiber optic material is removed from each of the fibers 26 and 30 by any suitable method, such as lapping, to form oval-shaped planar surfaces 58 and 60 in the fibers 26 and 30 that are coplanar with the confronting surfaces 58 and 60 of the substrates 50 and 52. The oval surfaces are juxtaposed in facing relationship to form an interaction region 66 where the evanescent field of light propagated by each of the fibers 26 and 30 interacts with the other fiber. The amount of fiber optic material removed increases gradually from zero near the edges of the substrates 50 and 52 to a maximum amount at their centers. As shown in FIGS. 4–6, the tapered removal of fiber optical material enables the fibers 26 and 30 to converge and diverge gradually, which is advantageous for avoiding backward reflection and excessive loss of light energy at the interaction region 66.

Light is transferred between the fibers 26 and 30 by evanescent field coupling at the interaction region 66. The optical fiber 26 comprises a central core 68 and a surrounding cladding 70. The fiber 30 has a core 72 and a cladding 74 that are substantially identical to the core 68 and cladding 70, respectively. The core 68 has a refractive index that is greater than that of the cladding 70, and the diameter of the core 68 is such that light propagating within the core 68 internally reflects at the core-cladding interface. Most of the optical energy guided by the optical fiber 26 is confined to its core 68. However, solution of the wave equations for the fiber 68 and applying the well-known boundary conditions shows that the energy distribution, although primarily in the core 68, includes a portion that extends into the cladding and decays exponentially as the radius from the center of the fiber increases. The exponentially decaying portion of the energy distribution within the fiber 68 is generally called the evanescent field. If the evanescent field of the optical energy initially propagated by the fiber 26 extends a sufficient distance into the fiber 30, energy will coupled from the fiber 26 into the fiber 30.

It has been found that to ensure proper evanescent field coupling, the amount of material removed from the fibers 26 and 30 must be carefully controlled so that the spacing between the cores of the fibers 26 and 30 is within a predetermined critical zone. The evanescent field extends a short distance into the cladding and decreased rapidly in magnitude with distance outside the fiber core. Thus, sufficient fiber optic material should be removed to permit overlap between the evanescent fields of waves propagated by the two fibers 26 and 30. If too little material is removed, the cores will not be sufficiently close to permit the evanescent fields to cause the desired interaction of the guided waves; and therefore, insufficient coupling will result.

Conversely, removal of too much material alters the propagation characteristics of the fibers, resulting in loss of light energy from the fibers due to mode perturbation. However, when the spacing between the cores of the fibers 26 and 30 is within the critical zone, each fiber 26 and 30 receives a significant portion of the evanescent field energy from the other to achieve good coupling without significant energy loss. The critical zone includes the region in which the evanescent fields of the fibers 26 and 30 overlap sufficiently to provide good evanescent field coupling with each core being within the evanescent field of light guided by the other core. It is believed that for weakly guided modes, such as the $HE_{11}$ mode guided by single mode fibers, mode perturbation occurs when the fiber core is exposed. Therefore, the critical zone is the core spacing that causes the evanescent fields to overlap sufficiently to cause coupling without causing substantial mode perturbation induced power loss.

The extent of the critical zone for a particular coupler depends upon a number of factors, such as the parameters of the fibers and the geometry of the coupler. The critical zone may be quite narrow for a single mode fiber having a step index profile. The center-to-center spacing of the fibers 26 and 30 is typically less that 2 to three core diameters.

The coupler 28 of FIGS. 1 and 4 includes four ports labeled 28A, 28B, 28C and 28D. Ports 28A and 28B, which are on the left and right sides, respectively, of the coupler 28 correspond to the fiber 26. The ports 28C and 28D similarly correspond to the fiber 30. For purposes of explanation, it is assumed that an optical signal input is applied to port 28A through the fiber 26. The signal passes through the coupler 28 and is output at either one or both of ports 28B or 28D depending upon the amount of coupling between the fibers 26 and 30. The "coupling constant" is defined as the ratio of the coupled power to the total ouput power. In the above example, the coupling constant is the ratio of the power output at port 28D dividied by the sum of the power output at the ports 28B and 28D. This ratio is sometimes called the "coupling efficiency", which is typically expressed as a percent. Therefore, when the term "coupling constant" is used herein, it should be understood that the corresponding coupling efficiency is equal to the coupling constant times 100.

The coupler 28 may be tuned to adjust the coupling constant to any desired value between zero and 1.0 by offsetting the confronting surfaces of the fibers 26 and 30 to control the dimensions of the region of overlap of the evanescent fields. Tuning may be accomplished by sliding the substrates 50 and 52 laterally or longitudinally relative to one another. In a March-Zehnder interferometer, the coupling constant is preferably 0.5, and the couplers are set so that their coupling constants are fixed at that value. It is also possible to construct the Mach-Zehnder interferometer with couplers having variable coupling constants.

The coupler 28 is highly directional, with substantially all of the power applied at one side thereof being output at the ports on the other side. Substantially all of the light applied as an input to either ports 28A or 28C is delivered to ports 28B and 28D without appreciable contra-directional coupling. The directional characteristic is symmetrical in that some light applied to either ports 28B or 28D is delivered to ports 28A and 28B. The coupler 28 is essentially non-discriminatory with respect to polarizations and preserves the polarization of light input thereto.

Light that is cross-coupled from one of the fibers 26 and 30 to the other undergoes a phase shift of $\pi/2$, but light that passes straight through the coupler 28 without being cross-coupled is not shifted in phase. For example, if the coupler 28 has a coupling constant of 0.5, and an optical signal is input to port 28A, then the outputs at ports 28B and 28D will be of equal magnitude; but the output at port 28D will be shifted in phase by $\pi/2$ relative to the output at port 28B.

The coupler 28 is a low loss device, having typical insertion losses of about 0.1% to 0.2%. The term "insertion loss" as used herein refers to the real scattering losses of light energy passing through the coupler 28. For example, if light energy is input to port 28A; and the light energy output at ports 28B and 28D totals 97% of the input energy, the insertion loss is 3%. The term "coupler transmission" is defined as one minus the insertion loss and is typically expressed an a decimal fraction.

The Substrates

The substrates 50 and 52 may be fabricated of any suitable rigid material. In a one preferred embodiment, the substrates 50 and 52 comprise generally rectangular blocks of fused quartz glass approximately 2.5 cm long, 2.5 cm wide and 1.0 cm thick. The fibers 26 and 30 may be secured in the curved grooves 54 and 56 by a suitable cement (not shown) such as epoxy resin. The fused quartz substrates 50 and 52 advantageously have a coefficient of thermal expansion similar to that of the fibers 26 and 30, which is important in maintaining predetermined coupling characteristics if the substrates 50 and 52 and the fibers 26 and 30 are subjected to any heat treatment during manufacture or use. For some applications the coupler 28 may comprise only the two fibers 26 and 30 with the two oval regions being fused or bonded together without being retained in the substrates 50 and 52.

Referring to FIGS. 7-11, the substrate 52 may be formed from a pair of side laminates 71 and 73 and a center laminate 75. The side laminates 71 and 73 are preferably formed as rectangular parallelepipeds. The center laminate 75 may be formed from a rectangular parallelipiped; however, an edge 77 of the center laminate 75 is machined to form a convex curve. The center laminate 75 preferably has a length of about 0.400 inches and a width of about 0.05 inches. The maximum height of the center laminate 75 is preferably about 0.045 inches. The side laminates 71 and 73 are substantially identical to one another. For example, the side laminate 71 is preferably about 0.400 inches long, about 0.040 inches thick and slightly higher than the 0.045 inch height of the center laminate. It has been found that a height of 0.050 inch is satisfactory for the side laminates 71 and 73.

The coupler is formed by placing the center laminate 75 between the two side laminates 71 and 73. The laminates 71, 73 and 75 are lined up length-wise so that the two larger flat surfaces of the center laminate 75 are held between two of the larger rectangular surfaces of the side laminates 71 and 73. Referring to FIG. 11. the center laminate 75 is positioned substantially entirely upon the side laminate 71 so that a portion of the side laminate 71 extends beyond the curved edge 77 of the center laminate 75. The side laminate 73 is placed on the center laminate 75 to be symmetrical with the side laminate 71. Since the height of the center laminates is about 0.005 inches greater than the 0.045 inch height of the center laminate, a convex groove is formed between the side laminates 71 and 73.

The three laminates 71, 73 and 75 are positioned together to form the groove 56 and are then clamped tightly together by any conventional clamping means. After the fiber 26 is placed in the groove 56, tension is applied to the fiber so that it conforms to the curvature of the groove. The laminates 71, 73 and 75 and fiber 26 are then bonded together.

The bonding process to form the coupler halves may simply involve applying a suitable adhesive to the coupler halves in a one-step bonding process. The laminates 70 and 72 are then lapped until a desired amount of the fiber 26 has been removed to form the interaction region.

Optical couplers are formed by bonding two coupler halves together with the planar portions of the fibers facing one another. The coupler halves may then be bonded together as described above by application of a suitable adhesive to the substrates while they are clamped together.

A laser fusion method for bonding the fibers 26 and 30 together may produce higher quality couplers for some applications than adhesive bonding.

The coupler 22 may be formed to have a desired coupling constant. One method for assuring achievement of a desired coupling constant includes the step of inputting an optical signal from a laser (not shown) into an end of the fiber 26. The intensities of the optical signals emanating from the fibers 26 and 30 after the input beam has impinged upon the interaction region 66 are monitored using suitable photodetectors (not shown) while the substrates are manipulated to achieve a desired coupling efficiency. The amount of coupling may be varied by moving the substrates to adjust the amount of overlap of the planar fiber surfaces. The coupling efficiency is $$\eta = 1 - I_t/I_i \quad (2)$$

$$= I_c(I_t + I_c)^{-1}, \quad (3)$$

where $\eta$ is the coupling efficiency, $I_i$ is the light intensity input to fiber 26, $I_t$ is the light transmitted through fiber 26 beyond the interaction region 42, and $I_c$ is the light intensity coupled from fiber 26 to fiber 30.

After the fibers 28 and 22 have been positioned to provide the desired coupling constant, energy is applied to the interface of the fibers 26 and 30. The energy source is preferably a $CO_2$ laser, and it should produce an output beam that will heat the fibers 28 and 22 to a temperature near the glass transition temperature. The energy source may also be an ultrasonic wave generator, an induction heating source or other suitable device for providing the desired amount of heat to the fibers 26 and 30.

The transition temperature is below the melting point of the glass from which the fibers 26 and 30 are formed. The transition temperature depends upon the materials comprising the fibers 26 and 30. Most optical fiber is formed from silicon dioxide with a dopant such as germanium dioxide or boron added thereto to control the refractive index. Such fibers typically have transition temperatures in the range of 1220° C. to 1200° C. The transition temperature should be determined experimentally for the fibers to be joined, and the energy output from the laser 98 should be controlled to assure that the temperature in the bonded region does not exceed the transition temperature. The transition temperature of an optical fiber is attained when the fiber begins to soften as the temperature increases.

Applying the output of the laser over the juncture of the fibers 26 and 30 fuses them together. It has been found that the above described method results in a bonded region having the same physical structure and the same optical characteristics as the material comprising fibers 26 and 30. Accordingly, local irregularities in the refractive indices are avoided, with the resultant interaction region 66 of the joined region having well behaved refractive indices throughout as expected for a molecularly consistent material. The step of coupling light from the fibers 26 and 30 while they are lapped permits sufficient control of the lapping depth fabrication to form the coupler 28 to have a predetermined coupling efficiency.

The primary difference between the steps for fabricating the evanescent field coupler 28 and an intercepting core coupler (not shown) is the depth to which the fibers 26 and 30 are lapped. The amount of coupling depends upon the length of the interaction zone, which is a function of the lapping depth and the radius of curvature of the fiber being lapped. It has been found that in general a 3 dB intercepting core coupler should have the fibers lapped to remove 50% of the core to provide full modal mixing. It is well known from electromagnetic theory that the energy distributions of the normal modes vary with the radial distance from the center of an optical fiber. The energy in the lower order modes tends to be primarily in the central region of the core, whereas the higher order modes tend to have more energy near the core/cladding interface. Since most of the energy in a multimode fiber is in the lower order modes, good coupling is facilitated by having the central regions of the cores in contact.

Mach-Zehnder Interferometer

The Mach-Zehnder interferometer 22 includes the pair of couplers 26 and 30 and the lengths of fibers 26 and 34 between the couplers. The lengths of the fiber 26 and the fiber 30 between the couplers 28 and 24 comprises a first arm 80 and a second arm 82, respectively. In general, the arms 80 and 82 have different lengths. One of the arms may be a sensing arm designed for exposure to a field to be measured, and the other arm may be a reference arm that is isolated from the field. Both arms may be exposed to the field as differential sensing arms. While the path difference is being adjusted, both arms are isolated from fields that would affect the propagation characteristics of light in the fibers.

The coupler 32 couples a portion of the signal in the second arm 82 back into the first arm 80 for output at port 32B while also coupling a portion of the signal first arm 80 into the second arm 82. A portion of the signal in the first arm 80 is guided from port 32A to port 32B. The coupler 32 combines portions of the signals from both arms 80 and 82 and produces output signals at ports 32B and 32 D that are superpositions of the intensities of portions both signals. The output intensity is the time averaged value of the square of the electric field. The combined signals form interference patterns in time that are output from ports 32B and 32D. These interference patterns are identical and depend upon the time delay between the signals as they travel between the couplers 26 and 30. The output from the port 32 B is the output of the Mach-Zehnder interferometer 22 and is supplied to the detector 31. Alternatively, the port 32D or both ports 32B and 32D may be arranged to provide signals to the detector. Providing output to the detector from both ports increases the signal to noise ratio.

Michelson Interferometer

Referring to FIG. 18, a Michelson interferometer 86 comprises a fiber optic directional coupler 87 and a pair of optical fibers 88 and a reference fiber 89. The fibers 88 and 89 terminate in mirrors 90 and 91, respectively. Light from the source 24 is input to one of the fibers, for example, the fiber 89, which guides the light to port 87A of the coupler 87. The coupler 87 couples part of the input light into the fiber 88 for output at port 87D. The mirror 90 reflects the signal back through the fiber 88 to port 87D. Light that is not cross coupled into the fiber 88 is output at port 87B and remains in the fiber 89. The mirror 91 reflects the reference signal back to port 87B.

The coupler 87 couples a portion of the signal input thereto into the fiber 88. The signals combine to produce interferences pattern an described above with reference to the Mach-Zehnder interferometer 22. The combined signals are output at port 87C for input to a detector such as the detector 31 of FIG. 1 for subsequent processing to determine the phase change in the signals.

Method of Operation

Figure 13:
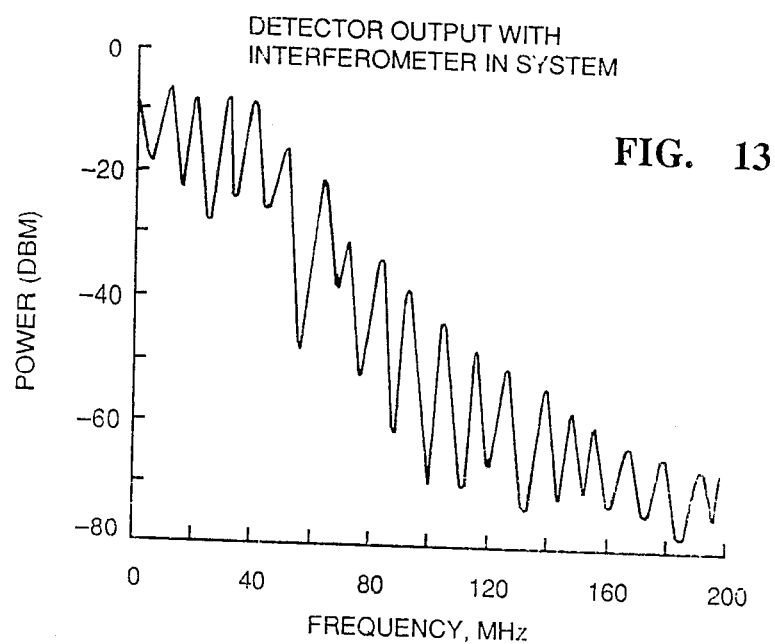
FIG. 13 graphically illustrates the output of the detector when it monitors the optical signals output from the interferometer of FIG. 1.

Referring to FIG. 13, the output of the Mach-Zehnder interferometer 22 is a series of periodic peaks and nulls when the optical input thereto is a sinusoidally intensity modulated incoherent beam. The frequency response of the Mach-Zehnder interferometer is $$|H(\omega)| = [R_1^4 + R_2^4 + 2R_1^2 R_2^2 \cos\omega\tau]^{\frac{1}{2}} \quad (4)$$

where $R_1$ and $R_2$ are the intensities of the beams in the sensing and reference arms, respectively; $\omega$ is the modulation frequency in radians/sec; and $\tau$ is the difference in the times for the sensing and reference beams to propagate through the interferometer. If the intensities of the two beams are adjusted to be equal so that $R_1 = R_2 = \frac{1}{2}$, then the frequency response of the Mach-Zehnder interferometer reduces to $$|H(\omega)| = (\frac{1}{2})|\cos\omega\tau/2| \quad (5)$$

Nulls occur at frequencies where $$\omega\tau/2 = M\pi/2 \quad (6)$$

where m is an odd integer. The time difference $\tau = nL/c$, where L is the pathlength difference; n is the effective the refractive index; and c is the velocity of light in vacuum. Substituting nL/c for $\tau$ and using $\omega = 2\pi f$ in Equation (4) gives the null frequencies in Hertz $$f_m = mc/2nL). \quad (7)$$

The resolution of the length measurement depends on the frequency resolution capability, or resolution bandwidth, of the network analyzer 34. This relationship can be expressed as:

$$\Delta L = mc\Delta f/(2nf_n^2)^{-1} \quad (8)$$

where
$\Delta L$ = length resolution, and
$\Delta f$ = frequency resolution.

It can be seen that for a constant resolution bandwidth, measurements at higher-order null frequencies gives more precise resolution of the length. Since the ouput coupler of the interferometer 22 acts as a summing point for the intensities (assuming a low coherence source) the total output intensity can be written (neglecting the DC components):

$$I(t) = (1+\epsilon)\sin \omega t + \sin \omega(t-\tau) \quad (9)$$

where
$\epsilon$ = intensity imbalance in system, and
$\tau$ = time delay between arms.
Equation (9) can be rewritten as $$I(t) = (1+\epsilon+\cos \omega\tau) \sin \omega t - \sin \omega\tau\cos \omega t. \quad (10)$$

The power at frequency is proportional to the sum of the squares of the in-phase and quadrature components, yielding:

$$P(\omega)\alpha(1+\epsilon+\cos \omega\tau)^2 + \sin^2\omega\tau. \quad (11)$$

The proportionally of expression (11) can be used to find a relationship between the power at various points near the null and the intensity imbalance ($\epsilon$). The first null occurs when $\omega\tau = \pi$. If we substitute $\omega\tau = \pi - \delta$, where $\delta << \pi$, in the proportionally above, the power may be expressed simply as $$P(\omega)\alpha\delta^2 + \epsilon^2 \quad (12)$$

Figure 14:
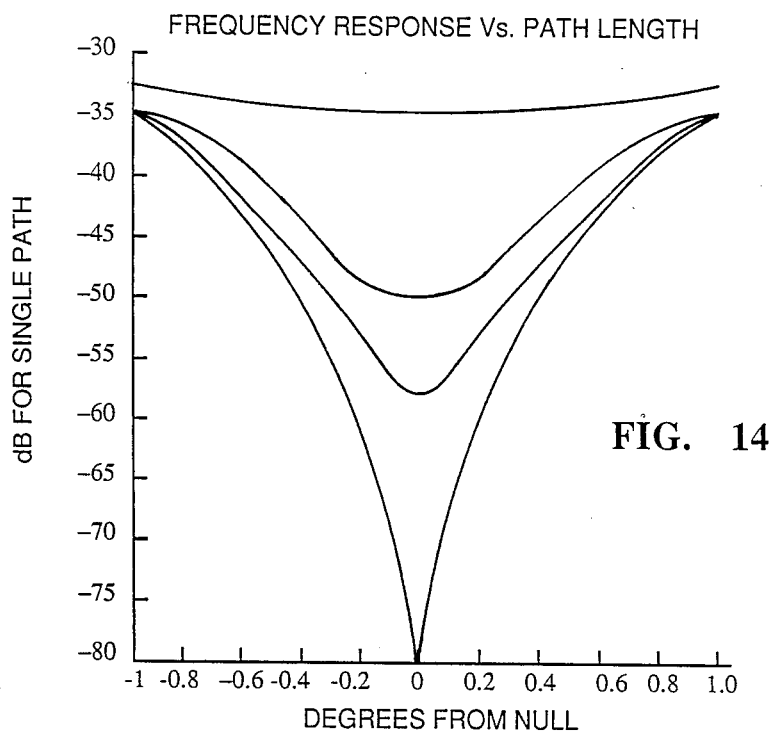
FIG. 14 graphically illustrates the frequency response versus pathlength for the system of FIG. 1.
Figure 15:
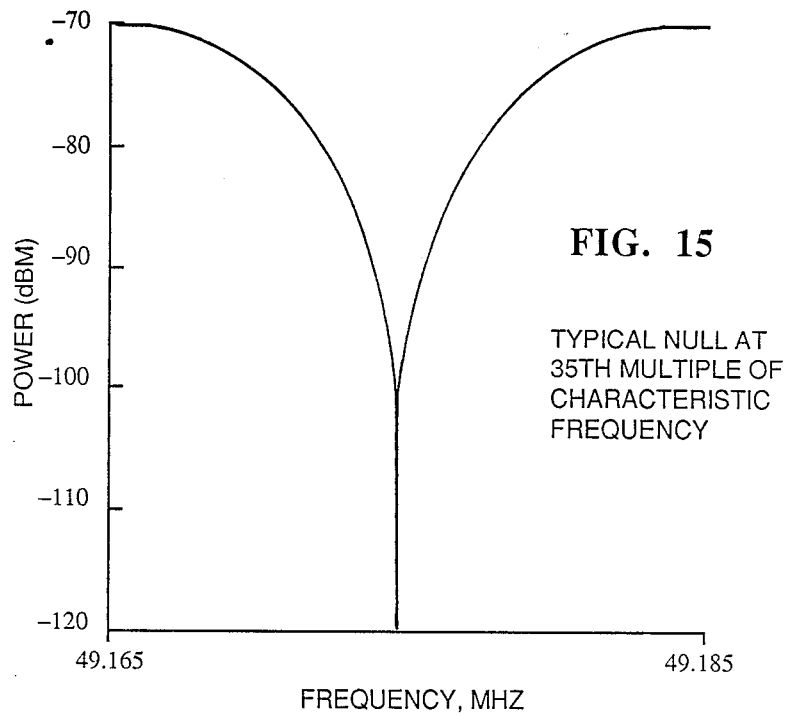
FIG. 15 graphically illustrates the signal output from the detector at the thirty-fifth null of the interference pattern produced by signals in the interferometer in the system of FIG. 1.

The lowest output power occurs at the null frequency $f_m$ ($\delta = 0$) with the intensities in each arm of the interferometer exactly balanced, ($\epsilon = 0$). As shown in FIG. 14, the depth of each null depends upon the intensity imbalance between the outputs of the sensing arm 80 and the reference arm 82. Therefore, in order to achieve best results the the intensities in the sensing and reference arms should be as nearly equal as possible. FIG. 15 shows a typical null obtained at the 35th multiple of the fundamental frequency.

After light is emitted from a coherent source, the light begins to lose its coherence. The distance required for the light to become incoherent is called the coherence length. A key feature of the present invention is that the coherence length of the light from the source 24 is much less than the path difference between lengths of the optical fibers 26 and 30. Normally, one arm is much shorter than the other. However when differential sensing arms are used, both arms are nearly the same length. In a typical Mach-Zehnder interferometer, the length of the shorter arm ranges from a few centimeters to a few hundred meters, and the length of the longer arm ranges from about 10 meters to a few hundred meters. Therefore, the fiber 30 is referred to as being the shorter fiber. The coherence length of the light emitted from the light source 22 is typically about 50 $\mu$.

When the incoherent light is intensity modulated before being input to the Mach-Zehnder interferometer, the interferometer exhibits the characteristics of a filter. The output intensity at a particular frequency is a function of the optical path difference. Certain frequencies produce intensity maxima, and other frequencies produce intensity minima, or nulls. These intensity maxima and minima are directly related to the difference in the lengths of the sensing and reference arms of the Mach-Zehnder interferometer. Therefore, an accurate measurement of one of the intensity maxima or minima can be used to determine the path length difference. In general, measurements of maxima are not as accurate as measurements of minima because of intensity fluctuations in the maxima.

The accuracy of the measurement is increased by measuring multiples of the first frequency that gives a null. The light source 22 preferably has a large modulation bandwidth, and the detector has a correspondingly wide detection bandwidth. The output of the detector is preferably analyzed with a tracking filter synchronized to the source of modulationthe high frequency network analyzer 34. Since the minima provide more accurate measurements than the maxima, both the detector 31 and the network analyzer 34 should be low noise devices. The network analyzer 34 provides an input signal that sweeps over the frequency range of interest. A typical frequency range is 50 Hz to 200 MHz. The network analyzer 34 acts as a tracking filter to the output of the Mach-Zehnder interferometer so that the response to the output tracks the source frequency. The preferred network analyzer is sold by Hewlett-Packard as model number 3577A, although an Anritsu MS420K having a frequency range of 10 KHz to 30 MHz also provides good results.

The preceding discussion assumed a light source with a coherence length much shorter than the path mismatch ($\Delta L$). This short coherence length prevents any interference between coherent light waves, which, in this system, can be considered a noise source. The ideal light source would be one which is completely incoherent.

Another factor to be considereed when selecting a source is the stability of both the output power and the operating wavelength. Power fluctuations in the interferometer will cause noise at the null and prevent a sharp, well defined null from being produced. Temperature fluctuations cause changes in the light wavelength and cause the refractive index to change. Referring to Eq. 2, changes in the index n will cause the null frequency $f_m$ to vary for a constant path difference. The preferred source is a General Optronics DIP - packaged SLD with Peltier effect cooler and thermistor temperature monitor. This SLD provides a wavelength of about 830 nm at maximum power output.

The modulation circuitry for the SLD is shown in FIG. 2. The DC bias is capacitively coupled to ground to remove high frequency interference. The series resistor 36 lets the AC source see an impedance of 50$\Omega$. The series capacitor 35 in the AC line prevents DC signals from feeding back into the AC source.

There are two major requirements for the detection system. The first requirement is having a very low noise floor to insure that the null does not get lost in the noise. The second requirement is having a wide bandwidth so that the higher order nulls can be measured. Hence, a low-noise wideband photodetector is desired. In this system the preferred detector comprises a Motorola MFOD2405 silicon integrated detector/preamp. This device has a specified bandwidth of 40 MHz and a typical RMS noise output of 0.5 mV over the full bandwidth. The responsivity of the detector 6 mV/$\mu$W. The schematic diagram for the detection system is shown in FIG. 3. The power supply 42 preferably includes four type "AA" batteries to reduce the possibility of 60 cycle interference. The output of the detector 31 is AC coupled through the non-inverting output 40$b$ to the primary coil of impedance transformer 43, which is used to make the detector output compatible with a 50$\Omega$ load.

Measurements at shorter wavelengths and higher frequencies give more accurate results than measurements at longer wavelengths and lower frequencies. High frequency nulls are more sharply defined than lower frequency nulls. Since measurements at the higher frequencies are desired, it is imperative to follow good high frequency construction techniques. These techniques include having a large continuous ground plane, removing the plastic casing and the leads from capacitors, removing all flux after soldering and using leads that are as short as possible. A metal housing (not shown) for the detector element 31 is also recommended.

The measured bandwidth of the system is 38.5 MHz (see FIG. 12). The bandwidth measurement was taken using a swept sine wave modulation of the SLD source. FIG. 13 shows the output when the same signal used to measure the bandwidth is sent through the interferometer 22.

Figure 17:
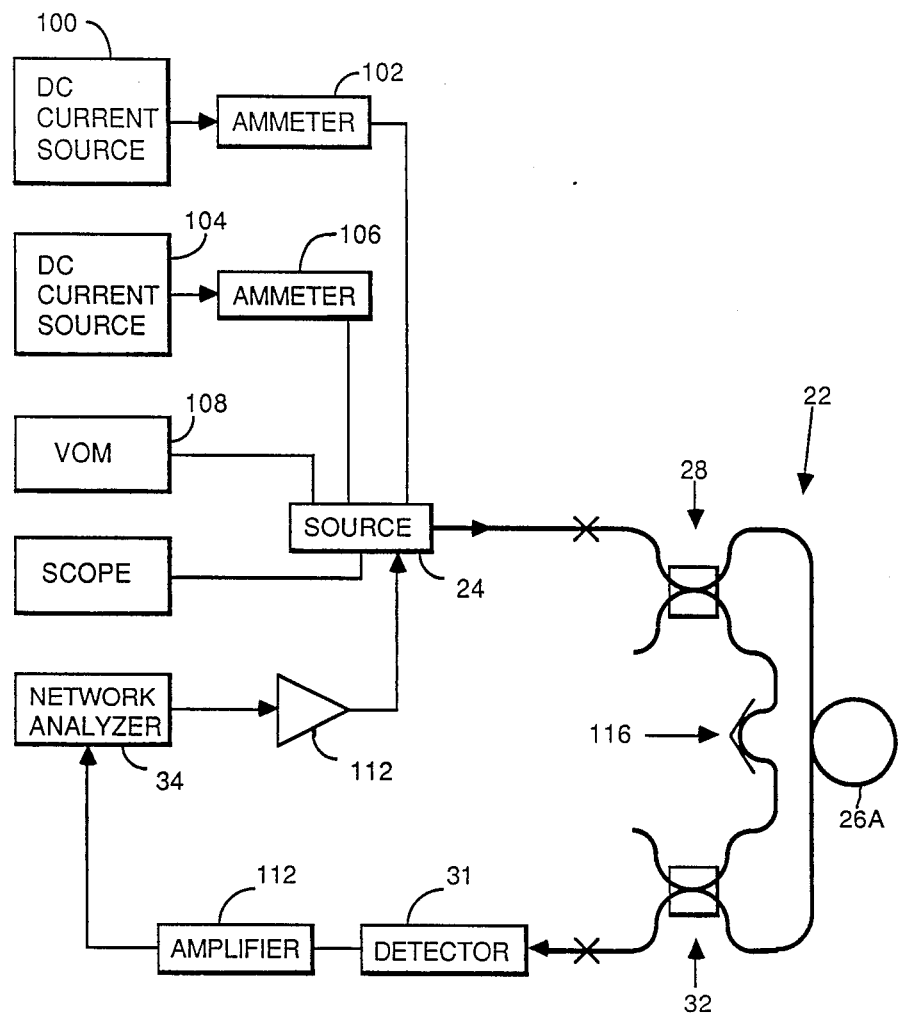
FIG. 17 is a block diagram of circuitry for controlling the optical source and monitoring the output of the interferometer.

FIG. 17 shows a block diagram of the complete system. The source 24 is controlled by a current source 100 with ammeter 102 for the diode drive, and a current source 104 with ammeter 106 for the Peltier cooler. An ohmmeter 108 provides a temperature readout. The modulation drive is supplied by a swept sine output from the network analyzer 34 which is passed through a 30 dB amplifier 110.

The detector output is directly connected to an HP 8447A low noise amplifier 112 (0.1–400 MHz), so that the null signal level is amplified above the noise floor of the network analyzer 34. The output of the amplifier 112 is connected to the network analyzer using a short, high-frequency cable 114.

As shown in Eq. 11, the null depth is a sensitive function of the intensity ratios. Therefore, a micro-bending device 116 is used in one arm (usually the short arm) of the interferometer, for fine-balancing the intensities. The microbending tool 116 should be as stable as possible since small changes in the intensity ratio cause large changes in null depth. Referring to FIG. 14, it may be seen that intensity ratio changes from 0.1 to 0.01% change the null depth by approximately 20 dB. The microbending tool 116 may be any suitable clamping device for forming small blends in the fiber. It is well known that small short radius bends in an optical fiber cause a loss of light signal intensity therein. The coupler 26 preferably couples more than 50% of the light incident thereon into the reference arm 82. Therefore, the initial light intensity in the reference arm 82 exceeds the ligth intensity in the sensing arm. The microbending tool 116 is then used to reduce the light intensity in the reference arm 82 while the depth of a selected null is monitored. The null is deepest when the sensing and reference arms guide equal light intensities.

The first step in the initial set-up is to define the operating conditions of the optical source 24. The monitor output of the source should be hooked to an oscilloscope 120 while finding the right combination of drive current and modulation drive. These should be adjusted to insure a large depth of modulation without introducing non-linear effects.

Once the source 24 is set, the drive current, modulation drive level, and temperature reading should be noted for future use. These conditions should always be the same when taking data to insure a consistent refractive index.

Next the interferometer 22 can be spliced onto the source fiber 26. The system output is monitored on the network analyzer 34. The high intensity arm of the interferometer 22 preferably is securely fastened to the bend loss device 120.

A specific null is then chosen making note of to what multiple of the fundamental the null corresponds. The frequency span of the analyzer is reduced to about 500 kHz and the bend loss device 116 is adjusted to create a deep null. The span is further reduced and the null depth again adjusted by using the bend loss device 116 to equalize the intensities of the beams. These steps are repeated until a span which results in the desired bandwidth (or length resolution) is attained. If a well-defined null cannot be achieved, then a higher order null should be used. This way, the same length resolution can be attained with a larger resolution bandwidth.

When adjusting an interferometer, a chart is useful in listing the amount of fiber removed from the long leg vs. the null frequency (referenced to the fundamental). The sensors should be initially constructed with the path difference 1.5-2 meters longer than required. An initial measurement is taken and the length calculated using a close estimate of the index. An amount of fiber is removed and measured and the next null is found. The first few cuts can be done in this manner. After three or four data points are found, the data can be fit to a straight line. As the data increases, an accurate projection of the final cut length is produced. It is important to remember that in a Michelson configuration, the amount of fiber removed is one-half of the change in path difference.

Referring to FIG. 16, the null frequency is plotted against length for a typical Mach-Zehnder interferometer. The data was taken for a fiber having a refractive index of 1.4604±0.0021 and an initial length of 9.3137±0.00096 meters. The standard deviation in the frequency measurements is 1.181 KHz. It is seen from FIG. 16 that the inverse of the null frequency is linearly related to the pathlength mismatch.

When removing fiber from a Mach-Zehnder interferometer, it is necessary only to cut the fiber, remove a portion and re-fuse. In a Michelson interferometer, one must remove a length of fiber and the re-mirror the fiber end. The mirroring must be secure, or noise at the nulls will result.

This system has provided the capability of matching path differences of multiple interferometric sensors with an average error of 200 μm. The null depth is consistently 85-90 dB below the peak values which represents an intensity ratio imbalance less than 0.0001. This system has also shown a high degree of repeatability when initial measurement conditions were duplicated.

What is claimed is:

1. A method for adjusting the pathlength difference in an optical pathlength mismatched interferometer having a first arm and a second arm, comprising the steps of:
   inputting portions of intensity modulated incoherent light into the first and second arms;
   monitoring signals output from the interferometer; and
   adjusting the length of one of the arms to produce a predetermined signal output from the interferometer.

2. The method of claim 1 wherein the step of adjusting the length of one of the arms includes the step of reducing the length of one of the arms to produce a null signal output from the interferometer.

3. The method of claim 2, further including the step of adjusting the arms to propagate substantially equal light intensities.

4. The method of claim 2, further including the steps of:
   forming the interferometer such that the first arm comprises a first optical fiber and the second arm comprises a second optical fiber;
   determining the refractive index of a selected one of the optical fibers; and
   removing a length of fiber from the selected fiber to produce a null signal output from the interferometer.

5. The method of claim 4, further including the step of adjusting the arms to propagate substantially equal light intensities.

6. The method of claim 4, further including the steps of:
   modulating the intensity of the incoherent light at a predetermined modulation frequency; and
   producing the null signal at a predetermined multiple of a fundamental frequency of the interferometer.

7. The method of claim 6 wherein the step of measuring the refractive index includes the step of measuring the null signal for a known length of the selected fiber and calculating the refractive index using the equation $n = mc/(2Lf_m)$ where n is the refractive index of the fiber, c is the free space velocity of light, m is an odd integer, L is the length of the fiber, and $f_m$ is the null frequency corresponding to the $m^{th}$ multiple of the fundamental frequency.

8. The method of claim 6, further including the steps of:
   (a) forming the interferometer such that the first arm comprises a first optical fiber and the second arm comprises a second optical fiber, the optical fibers providing an optical pathlength difference $\Delta L_o$;
   (b) determining the refractive index of a selected one of the optical fibers; and
   (c) measuring the null frequency with an initial predetermined frequency resolution bandwidth;
   (d) calculating an initial length resolution using the equation $\Delta L = mc\Delta f/(2nf_m^2)$, where n is the refractive index of the fiber, c is the free space velocity of light, m is an odd integer, and $f_m$ is the null frequency corresponding to the $m^{th}$ multiple of fundamental frequency of the interferometer;

(e) reducing the length of the selected fiber;
(f) reducing the frequency resolution bandwidth to a new predetermined value;
(g) measuring the null frequency at the new frequency resolution bandwidth; and
(h) repeating steps (d) through (g) until a predetermined length resolution is obtained.

9. The method of claim 8 further including the step of adjusting the arms to propagate substantially equal light intensities.

10. The method of claim 3, further including the steps of:
(a) setting the lengths of the arms to have an initial optical pathlength difference $L_o$;
(b) determining a frequency corresponding to a null signal output from the interferometer;
(c) calculating the refractive index using the equation $n = mc/(2f_m L_o)$ where n is refractive index, c is the free space velocity of light, m is an integer, and $f_m$ is the null frequency corresponding to the $m^{th}$ multiple of a fundamental frequency for th interferometer;
(d) removing a length x of fiber from the selected arm so that the pathlength difference is $L_o - x$;
(e) measuring the $m^{th}$ null frequency corresponding to the pathlength difference $L_o - x$;
(f) calculating x using the equation $f^{-1} = (2nL_o/c) + (2nx/c)$; and
(g) repeating steps (c) through (f) until a predetermined pathlength difference is obtained.

11. The method of claim 1, further including the steps of:
(a) forming the interferometer such that the first arm comprises a first optical fiber and the second arm comprises a second optical fiber, the optical fibers providing an optical pathlength difference $\Delta L_o$;
(b) determining the refractive index of a selected one of the optical fibers; and
(c) measuring the null frequency with an initial predetermined frequency resolution bandwidth;
(d) calculating an initial length resolution using the equation $\Delta L = mc\Delta f/(2nf_m^2)$, where n is the refractive index of the fiber, c is the free space velocity of light, m is an odd integer, and $f_m$ is the null frequency corresponding to the $m^{th}$ multiple of fundamental frequency of the interferometer;
(e) reducing the length of the selected fiber;
(f) reducing the frequency resolution bandwidth to a new predetermined value;
(g) measuring the null frequency at the new frequency resolution bandwidth to determined a new length resolution; and
(h) repeating steps (d) through (f) until a predetermined length resolution is obtained.

12. The method of claim 11, further including the step of adjusting the arms to propagate substantially equal light intensities.

13. Apparatus for adjusting the pathlength difference in a pathlength mismatched interferometer having a first arm and a second arm, comprising:
means for inputting portions of intensity modulated incoherent light into the first and second arms;
means for monitoring signals output from the interferometer; and
means for adjusting the length of one of the arms to produce a predetermined signal output from the interferometer.

14. The apparatus of claim 13 wherein the means for adjusting the length of one of the arms includes means for reducing the length of one of the arms to produce a null signal output from the interferometer.

15. The apparatus of claim 14, further including means for adjusting the arms to propagate substantially equal light intensities.

16. The apparatus of claim 15, further including:
means for forming the interferometer such that the first arm comprises a first optical fiber and the second arm comprises a second optical fiber;
means for determining the refractive index of a selected one of the optical fibers; and
means for removing a length of fiber from the selected fiber to produce a null signal output from the interferometer.

17. The apparatus of claim 16, further including means for adjusting the arms to propagate substantially equal light intensities.

18. The apparatus of claim 16, further including:
means for modulating the intensity of the incoherent light at a predetermined modulation frequency; and
means for producing the null signal at a predetermined multiple of the modulation frequency.

19. The apparatus of claim 18 wherein the means for measuring the refractive index includes:
means for measuring the null signal for a known length of the selected fiber; and
computing means for calculating the refractive index using the equation $n = mc/(2Lf_m)$ where n is the refractive index of the fiber, c is the free space velocity of light, m is an odd integer, L is the length of the fiber, and $f_m$ is the null frequency corresponding to the integer m.

20. The apparatus of claim 13, wherein the interferometer is formed such that the first arm comprises a first optical fiber and the second arm comprises a second optical fiber, further including:
means for determining the refractive index of a selected one of the optical fibers;
means for measuring the null frequency with an initial predetermined frequency resolution bandwidth to determine an initial length resolution;
means for reducing the length of the selected fiber;
means for reducing the frequency resolution bandwidth to a new predetermined value;
means for measuring the null frequency at the new frequency resolution bandwidth to determine a new length resolution.

21. The apparatus of claim 14, wherein the interferometer is formed such that the first arm comprises a first optical fiber and the second arm comprises a second optical fiber, further including:
means for determining the refractive index of a selected one of the optical fibers;
means for measuring the null frequency with an initial predetermined frequency resolution bandwidth to determine an initial length resolution;
means for reducing the length of the selected fiber;
means for reducing the frequency resolution bandwidth to a new predetermined value; and
means for measuring the null frequency at the new frequency resolution bandwidth to determine a new length resolution.

* * * * *